(12) United States Patent
Yin et al.

(10) Patent No.: US 11,132,700 B1
(45) Date of Patent: Sep. 28, 2021

(54) IDENTIFYING DIRECT AND INDIRECT EFFECTS IN A/B TESTS

(71) Applicant: Etsy, Inc., Brooklyn, NY (US)

(72) Inventors: Xuan Yin, Harrison, NJ (US); Liangjie Hong, New York, NY (US)

(73) Assignee: Etsy, Inc., Brooklyn, NY (US)

( * ) Notice: Subject to any disclaimer, the term of this patent is extended or adjusted under 35 U.S.C. 154(b) by 7 days.

(21) Appl. No.: 16/678,739

(22) Filed: Nov. 8, 2019

Related U.S. Application Data (60) Provisional application No. 62/760,509, filed on Nov. 13, 2018.

(51) Int. Cl.
*G06Q 30/02* (2012.01)
*G06F 17/18* (2006.01)

(52) U.S. Cl.
CPC ......... *G06Q 30/0201* (2013.01); *G06F 17/18* (2013.01)

(58) Field of Classification Search
CPC .......................... G06Q 30/0201; G06F 17/18
USPC ...................................................... 705/14.42
See application file for complete search history.

(56) References Cited

FOREIGN PATENT DOCUMENTS

CN        206725229 U    * 12/2017

OTHER PUBLICATIONS

Christina Newberry, A/B Testing on Social Media: How to Do it with Tools You Already Have, 2017 (Year: 2017).*
Andrews, "Heteroscedasticity and Autocorrelation Consistent Covariance Matrix Estimation", Econometrical, May 1991, 59(3):817-858.
Baron et al., "The moderator-mediator variable distinction in social psychological research: Conceptual, strategic, and statistical considerations", Journal of Personality and Social Psychology, 1986, 51(6):1173-1182.
Chausse, "Computing Generalized Method of Moments and Generalized Empirical Likelihood with R", Journal of Statistical Software, 2010, 34(11):1-35.
Hansen et al., "Finite-Sample Properties of Some Alternative GMM Estimators", Journal of Business and Economic Statistics, 1996, 14(3):262-280.
Heckman et al., "Econometric Mediation Analyses: Identifying the Sources of Treatment Effects from Experimentally Estimated Production Technologies with Unmeasured and Mismeasured Inputs", Econometric Reviews, 2015, 34(1-2):6-31.

(Continued)

*Primary Examiner* — Tarek Elchanti
(74) *Attorney, Agent, or Firm* — Fish & Richardson P.C.

(57) ABSTRACT

Methods, systems, and apparatus, including computer programs encoded on a computer storage medium, for performing an A/B test on a target element of an online platform. In one aspect, a method comprises: conducting an A/B test on a target element of an online platform, comprising: for each user in a population of users, measuring: (i) an outcome of the user interacting with the online platform, and (ii) an interaction of the user with a mediator element of the online platform; and determining, based on the A/B test, a direct effect value that estimates an expected change in user outcomes when the test version of the target element is presented instead of the control version of the target element that is caused independently of induced changes in user interaction with the mediator element.

20 Claims, 4 Drawing Sheets

(56) References Cited

OTHER PUBLICATIONS

Hertzog, "Trends in Mediation Analysis in Nursing Research: Improving Current Practice", Western Journal of Nursing Research, Jan. 2017, 40(6):907-930.

Holland, "Statistics and Causal Inference", Journal of the American Statistical Association, 1986, 81(396):945-970.

Imai et al., "Commentary: Practical Implications of Theoretical Results for Causal Mediation Analysis", Psychological Methods, Feb. 2014, 19(4):482-487.

Imai et al., "Identification and Sensitivity Analysis for Multiple Causal Mechanisms: Revisiting Evidence from Framing Experiments", Political Analysis, 2013, 21:141-171.

Imai et al., "Identification, Inference and Sensitivity Analysis for Causal Mediation Effects", Statistical Science, 2010, 25(1):51-71.

Keele et al., "Identifying Mechanisms Behind Policy Interventions via Causal Mediation Analysis", Journal of Policy Analysis and Management, 2015, 34(4):937-963.

Lewbel, "The Identification Zoo—Meanings of Identification in Econometrics", Forthcoming in Journal of Economic Literature, 2018, 57(4):1-113.

Newey et al., "A Simple, Positive Semi-Definite, Heteroscedasticity and Autocorrelation Consistent Covariance Matrix", NBER Technical Paper Series, 1988, 14 pages.

Ogburn, "Commentary on "Mediation Analysis without sequential ignorability: Using baseline covariate interacted with random assignment as instrumental variable" by Dylan Small", Journal of Statistical Research, 2012, 46(2):105-111.

Pearl, "Direct and Indirect Effects", Proceedings of the 17th Conference on Uncertainty in Artificial Intelligence, 2001, pp. 411-420.

Pearl, "Interpretation and identification of Causal Mediation", Psychological Methods, 2014, 19(4):459-481.

Pearl, "Reply to commentary by Imai, Keele, Tingley, and Yamamoto concerning causal mediation analysis", Psychological Methods, 2014, 19(4):488-492.

Peysakhovich et al., "Learning causal effects from many randomized experiments using regularized instrumental variables", arXiv:1701.01140v3, Jun. 1, 2017, 13 pages.

Robins, "Semantics of Causal DAG Models and the Identification of Direct and Indirect Effects", Highly Structured Stochastic Systems, 2003, pp. 70-82.

Rosenbaum et al., "The central role of the propensity score in observational studies for causal effects", Biometrika, 1983, 70(1):41-55.

Rubin, "Basic Concepts of Statistical Inference for Causal Effects in Experiments and Observational Studies", Cambridge, MA: Harvard University, Department of Statistics, 2003, 140 pages.

Rucker et al., "Mediation Analysis in Social Psychology: Current Practices and New Recommendations", Social and Personality Psychology Compass, 2011, 5(6):359-371.

Shpitser, "Counterfactual Graphical Models for Longitudinal Mediation Analysis with Unobserved Confounding", Cognitive Science: A Multidisciplinary Journal, 2013, 37,:1011-1035.

Small, "Mediation Analysis Without Sequential Ignorability: Using Baseline Covariates Interacted with Random Assignment as Instrumental Variables", Journal of Statistical Research, 2012, 46(2):91-103.

Tchetgen et al., "On Identification of natural direct effects when a confounder of the mediator is directly affected by exposure", Epidemiology, 2014, 25(2):1-21.

Ten Have et al., "Causal Mediation Analyses with Rank Preserving Models", Biometrics, 2007, 63(3):926-934.

Wooldridge, Econometric Analysis of Cross Section and Panel Data, MIT Press, 2010.

\* cited by examiner

| Outcome | % Change = ATE/mean of Control |
|---|---|
| Recommendation Clicks | 28.3131% |
| Conversation | 0.2202% |
| GMV | -0.2518% |
| Organic Search Clicks | -1.3658% |

| | Outcome: Conversion | | Outcome: GMV | |
|---|---|---|---|---|
| Effect | % Change | Std Error | % Change | Std Error |
| GADE(0) | 0.4959%* | 0.000272 | 0.1681% | 0.037515 |
| GADE(1) | 0.4905%* | 0.000271 | 0.1700% | 0.037294 |
| GACME(0) | -0.2703%*** | 0.000047 | -0.4219%*** | 0.003701 |
| GACME(1) | -0.2757%*** | 0.000049 | -0.4200%*** | 0.003733 |
| ATE | 0.2202% | 0.000275 | -0.2518% | 0.037582 |

IDENTIFYING DIRECT AND INDIRECT EFFECTS IN A/B TESTS

CROSS-REFERENCE TO RELATED APPLICATIONS

This application claims the benefit under 35 U.S.C. § 119(e) of the filing date of U.S. Patent Application No. 62/760,509 for IDENTIFICATION IN CAUSAL MEDIATION ANALYSIS WITH MULTIPLE UNMEASURED CAUSALLY DEPENDENT MEDIATORS, which was filed on Nov. 13, 2018, and which is incorporated here by reference in its entirety.

BACKGROUND

This specification relates to identifying direct and indirect effects in A/B tests.

Randomized experiments such as A/B tests are broadly applicable. For example, consumers are increasingly using the Internet to purchase goods and services through electronic commerce (e-commerce) websites. An A/B test is an example of a randomized experiment that is popular in industry to compare multiple versions of a webpage, a module, or an app to determine which version is best.

SUMMARY

This specification describes a system implemented as computer programs on one or more computers in one or more locations that can perform an A/B test on a target element of an online platform.

According to a first aspect there is provided a method that includes conducting an A/B test on a target element of an online platform. A population of users of the online platform is split into at least a control group of users and a test group of users. A control version of the target element is presented to the control group of users and a test version of the target element is presented to the test group of users. For each user in the population of users, an outcome of the user interacting with the online platform and an interaction of the user with a mediator element of the online platform are measured. A direct effect value that estimates an expected change in user outcomes when the test version of the target element is presented instead of the control version of the target element that is caused independently of induced changes in user interaction with the mediator element is determined based on the A/B test. An indirect effect value that estimates an expected change in user outcomes when the test version of the target element is presented instead of the control version of the target element that is caused by induced changes in user interaction with the mediator element is determined based on the A/B test.

In some implementations, determining the direct effect value and the indirect effect value includes identifying values of coefficients of a system of equations based on the A/B test. The system of equations includes: a first equation that expresses user interaction with the mediator element as a function of whether the control version or the test version of the target element was presented, and a second equation that expresses the outcome of user interaction with the online platform as a function of: (i) whether the control version or the test version of the target element was presented, and (ii) user interaction with the mediator element. The direct effect value and the indirect effect value are determined based on the values of the coefficients of the system of equations.

In some implementations, the first equation and the second equation are linear equations.

In some implementations, identifying the values of the coefficients of the system of equations includes using an ordinary least squares technique.

In some implementations, identifying the values of the coefficients of the system of equations includes using an iterative general method of moments (ITGMM) technique.

In some implementations, the method further includes determining a statistical significance of the direct effect value and determining a statistical significance of the indirect effect value.

In some implementations, the online platform includes an e-commerce website.

In some implementations, splitting the population of users of the online platform into at least the control group of users and the test group of users includes randomly splitting the population of users of the online platform into at least the control group of users and the test group of users.

In some implementations, the target element of the online platform includes a recommendation module.

In some implementations, the mediator element of the online platform includes a search module.

In some implementations, the mediator element of the online platform includes a promoted listings module.

In some implementations, the outcome of the user interacting with the online platform includes a conversion status of the user or a value of products purchased by the user on the online platform.

In some implementations, the A/B test does not measure user interaction with one or more causally-dependent mediator elements of the online platform.

According to a second aspect there is provided a system of one or more computers and one or more storage devices communicatively coupled to the one or more computers, where the one or more storage devices store instructions that, when executed by the one or more computers, cause the one or more computers to perform the operations of the first aspect.

According to a third aspect there are provided one or more non-transitory computer storage media storing instructions that when executed by one or more computers cause the one or more computers to perform the operations of the first aspect.

Particular embodiments of the subject matter described in this specification can be implemented so as to realize one or more of the following advantages.

The A/B testing system described in this specification can perform A/B testing to compare different versions of a "target" element of an online platform, in particular, a "control" version and a "test" version of the target element. The system can compare the control and test versions of the target element by determining the effect on user outcomes of presenting the test version instead of the control version of the target element. "User outcomes" can refer to any appropriate outcome of user interaction with the online platform, e.g., conversion status (as will be described in more detail below). Generally, presenting the test version instead of the control version of the target element can induce changes in how users interact with other elements of the online platform, referred to as "mediator" elements. Induced changes in user interaction with mediator elements can affect user outcomes. Therefore, rather than determining only the overall effect on user outcomes of presenting the test version instead of the control version of the target element (as in some alternative systems), the system described in this specification can determine a "direct effect" and an "indirect effect" on user outcomes. The direct effect estimates the resulting change in user outcomes that is caused independently of induced changes in user interaction with a specified mediator element. The indirect effect estimates the resulting change in user outcomes that is caused by induced changes in user interaction with the mediator element.

By identifying the direct and indirect effects of presenting the test version instead of the control version of the target element, the system described in this specification can facilitate better informed decision making. In one example, testing a new algorithm for a recommendation module on an e-commerce website may result in a statistically insignificant increase in conversion rates. The system may determine that the direct effect of the new recommendation module, independent of induced changes in user interaction with a search module of the e-commerce website, is a statistically significant increase in the user conversion rate. The system may further determine that the indirect effect of the new recommendation module, caused by induced changes in user interaction with the search module, is a statistically significant decrease in the user conversion rate. That is, the new recommendation module significantly increases the conversion rate, but this increase is offset by a corresponding decrease in the conversion rate that is caused by induced changes in user interaction with the search module. In this example, an administrator of the e-commerce website may determine that the new recommendation module should be deployed (despite the overall insignificant increase in the user conversion rate), and that the search module should be improved to work better with the new recommendation module.

The system described in this specification can account for unmeasured causally-dependent mediator elements in estimating the direct and indirect effects of presenting the test version instead of the control version of the target element. A mediator element may be referred to as "unmeasured" if the system does not measure user interaction with the mediator element during the AB test. A mediator element may be referred to as "causally-dependent" if user interaction with the mediator element is causally related to one or more of: (i) whether the control version or the test version of the target element is presented, (ii) user interaction with one or more measured mediator elements, and (iii) user outcomes. For many online platforms, measuring every possible causally-dependent mediator may be infeasible, e.g., for an e-commerce website with hundreds of webpages, where each selectable user interface element (e.g., button) on each webpage could be considered a mediator element. By accounting for the potential presence of unmeasured causally-dependent mediator elements, the system described in this specification can achieve a higher accuracy (e.g., in identifying direct and indirect effects) than it otherwise would.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system that can perform A/B testing to compare different versions of an element (referred to as a "target" element) of an online platform. Throughout this specification, an "online platform" may refer to, e.g., a web site or an application. An "element" of an online platform can refer to any feature of the online platform that facilitates user interaction with the online platform, e.g., a search module, a promoted listings module, or a recommendation module. In one example, the system can perform A/B testing to compare a "control" version and a "test" version of a recommendation module, where each version uses a different algorithm to determine items to be recommended to users of the online platform. The system may compare different versions of a target element of an online platform by splitting users of the online platform into different groups, presenting a respective version of the target element to each group, and measuring a resulting "outcome" of the interaction of each user with the online platform. The outcome of a user interacting with the online platform may refer to, e.g., whether the user purchased of a good or service ("product") offered on the online platform (the "conversion status" of the user), or the value of products purchased by the user on the online platform (the "gross merchandise value", GMV). Based on the results of the A/B test, the "best" version of the target element can be identified (e.g., the version of the element that optimizes the overall conversion rate or GMV) and thereafter presented to users of the online platform.

Generally, presenting a different version of a target element of an online platform can affect how users interact with other elements of the online platform (referred to as "mediator" elements). For example, presenting a different version of a recommendation module of an electronic commerce (e-commerce) web site can affect how users interact with a search module of the e-commerce website. A change in user interaction with a mediator element that results from presenting a test version instead of a control version of a target element may be referred to as an "induced change" in user interaction with the mediator element.

An A/B test can be used to determine the overall effect on user outcomes of presenting a test version instead of a control version of a target element of an online platform. In addition to determining the overall effect, the system described in this specification can determine a "direct effect" and an "indirect effect" on user outcomes of presenting the test version instead of the control version of the target element. The direct effect estimates the resulting change in user outcomes that is caused independently of induced changes in user interaction with a specified mediator element. The indirect effect estimates the resulting change in user outcomes that is caused by induced changes in user interaction with the mediator element.

These features and other features are described in more detail below.

Figure 1:
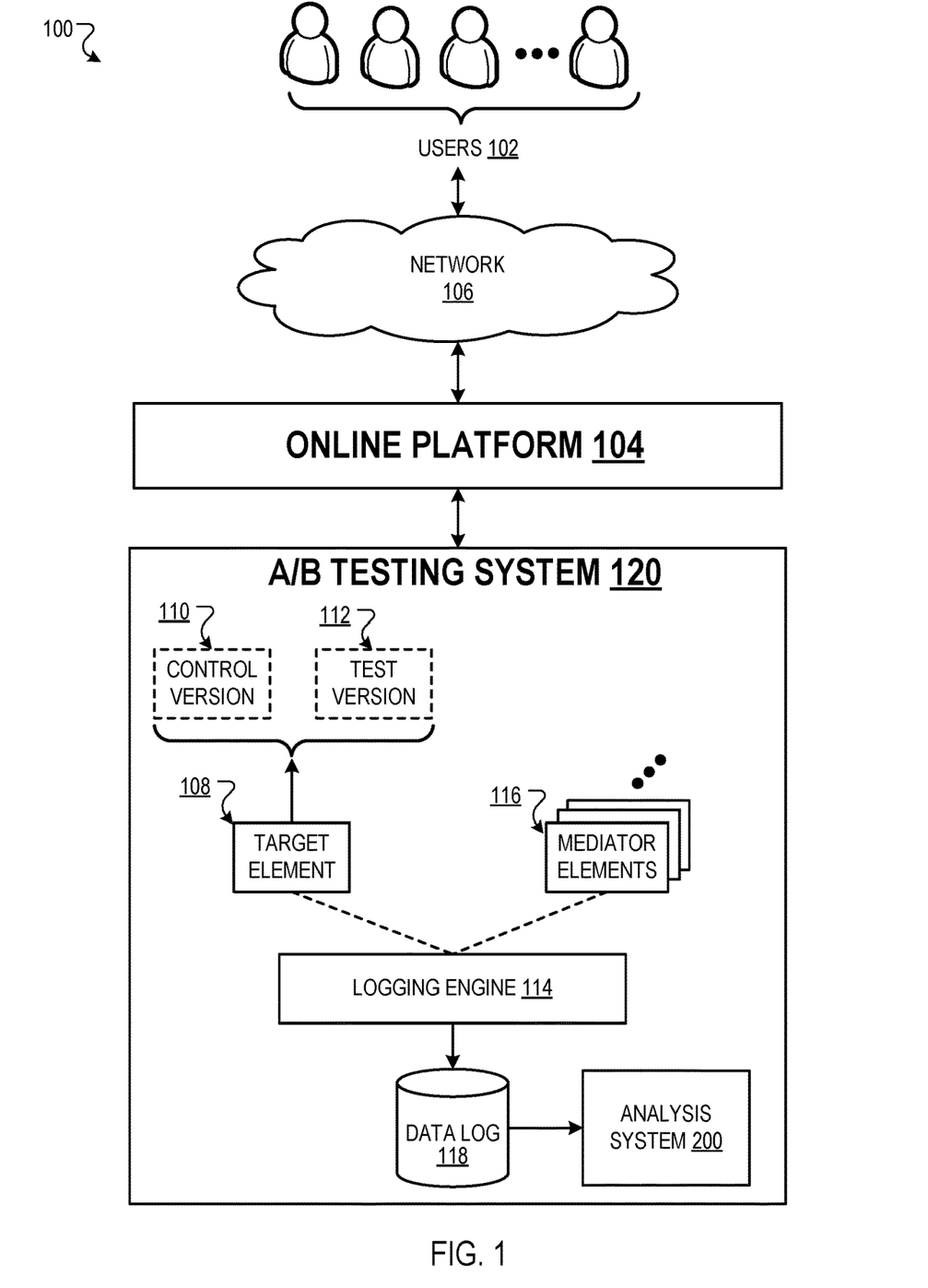
FIG. 1 shows an example environment where users can interact with an online platform.

FIG. 1 shows an example environment 100 where users 102 can interact with an online platform 104. The online platform 104 may be, e.g., a website or an application. In one example, the online platform may be an e-commerce platform, where users 102 can purchase products offered on the e-commerce platform. In another example, the online platform may be a social networking platform. In another example, the online platform may be streaming platform, e.g., a video or music streaming platform. In another example, the online platform may be news platform, i.e., that provides information directed to current events.

Users 102 can interact with the online platform 104 by using a user device (e.g., a smartphone, tablet, or desktop computer) to transmit information to the online platform and receive information from the online platform 104 over a network 106. The network 106 may be, e.g., a local area network, a wide area network, or the Internet.

An A/B testing system 120 can perform A/B testing to compare multiple versions of a target element 108 of the online platform 104. For convenience, the testing system 120 will be described herein as performing an A/B test to compare two version of the target element 108, in particular, the "control" version 110 and the "test" version 112. More generally, the testing system 120 can use the techniques described herein to compare more than two versions of the target element 108.

The target element 108 can be any appropriate element of the online platform, e.g., a search module, a promoted listings module, or a recommendation module. A search module may refer to a feature of the online platform that enables a user to obtain a set of search results in response to submitting a search query. In one example, the platform 104 may be an e-commerce platform, the search queries may specify products or product categories that are of interest to the user, and the search results may identify related products being offered for sale on the platform. A promoted listings module may refer to a feature of the online platform that affects the ranking of search results provided by the search module, e.g., by ranking search results that identify promoted listings higher than they otherwise would be. A promoted listing may refer to a content item (e.g., identifying a product) that is provided to the online platform by a publisher along with additional compensation to make the content item eligible to be provided as a promoted listing in response to search queries. A recommendation module may refer to a feature of the online platform that identifies content items available on the platform 104 that may be of interest to a user and recommends the identified content items to the user. For example, a recommendation module may identify products that the user may have an interest in purchasing through the online platform based on previous purchases made by the user through the online platform.

The control version 110 and the test version 112 of the target element 108 may differ in any of a variety of ways. For example, the control version 110 and the test version 112 of the target element 108 may operate in accordance with a different algorithm. In a particular example, the target element 108 may be a recommendation module that identifies content items that may be of interest to the user (as described above). In this example, the control version 110 and the test version 112 of the recommendation module may identify content items that may be of interest to the user by processing data characterizing the user (e.g., previous purchases made by the user) using different algorithms. In another example, the control version 110 and the test version 112 of the target element 108 may have a different user interface. In a particular example, the target element 108 may be a search module, the control version 110 may present the search module more prominently to the user (e.g., at the top of a webpage), and the test version 112 may present the search module less prominently to the user (e.g., in a sidebar or at the bottom of the webpage).

To compare the control version 110 and the test version 112 of the target element 108, the testing system 120 splits the population of users 102 of the online platform into a "control" group of users and a "test" group of users. The testing system 120 presents the control version 110 of the target element 108 to the control group of users and the test version 112 of the target element 108 to the test group of users. (More generally, the testing system 120 could compare more than two versions of the target element 108 by splitting the population of users into more than two groups and presenting a different version of the target element 108 to each group). In one example, each time a user 102 interacts with the online platform 104, the testing system 120 may randomly assign the user to either the control group or the test group.

For each user 102, the testing system 120 uses a logging engine 114 to log data measuring: (i) interaction of the user with one or more mediator elements 116 of the online platform, and (ii) an outcome of the user interacting with the online platform 104. The logging engine 114 may store the logged data in a data log 118 which may be implemented, e.g., as a logical data storage area or a physical data storage device. Each mediator element 116 is an element of the online platform that differs from the target element 108. In one example, the target element 108 may be a recommendation module, and the mediator elements 116 may be a search module and a promoted listings module of the online platform 104.

The logging engine 114 can measure user interaction with a mediator element, e.g., by the number of times the user interacts with a user interface of the mediator element. In one example, the logging engine 114 can measure user interaction with a search module by the number of search queries submitted by the user. In another example, the logging engine 114 can measure user interaction with a recommendation module as the number of times the user interacts with a user interface of the recommendation module to obtain more information about a recommended content item. In another example, the logging engine 114 can measure user interaction with a promoted listings module by the number of times the user selects promoted listings provided in response to search queries. The logging engine 114 can measure the outcome of a user interacting with the online platform 104, e.g., as the conversion status of the user, or the GMV of products purchased by the user through the online platform.

Generally, the testing system 120 may measure (and log) user interaction with a limited set of mediator elements rather than with every possible mediator element, e.g., for computational feasibility reasons. For example, the online platform 104 may be an e-commerce website with hundreds of webpages, where each selectable user interface element (e.g., button) on each webpage could be considered a mediator element. In this example, measuring user interaction with every possible user interface element may be computationally infeasible, e.g., due to the data storage requirements such measurement would necessitate. The testing system 120 may be configured to measure user interaction with particular mediator elements (in some cases, a single mediator element) that are hypothesized to be causally linked with the target element. For example, the testing system 120 may be configured to measure user interaction with mediator elements where presenting a different version of the target element is hypothesized to induce a significant change in user interaction with the mediator element. In a particular example, the target element may be a recommendation module, and the testing system 120 may be configured to measure user interaction with a search module, since improvements in the recommendation module may reduce user interaction with the search module.

The testing system 120 uses an analysis system 200 to process the logged data 118 to determine, for each measured mediator element: (i) a direct effect value, and (ii) an indirect effect value, of presenting the test version instead of the control version of the target element. The direct effect value estimates an expected change in user outcomes that is caused independently of induced changes in user interaction with the mediator element. The indirect effect value estimates an expected change in user outcomes that is caused by induced changes in user interaction with the mediator element. An example analysis system 200 is described in more detail with reference to FIG. 2. The testing system 120 can provide the output of the analysis system 200 to a user of the testing system 120, e.g., through an application programming interface (API) made available by the testing system 120.

Figure 2:
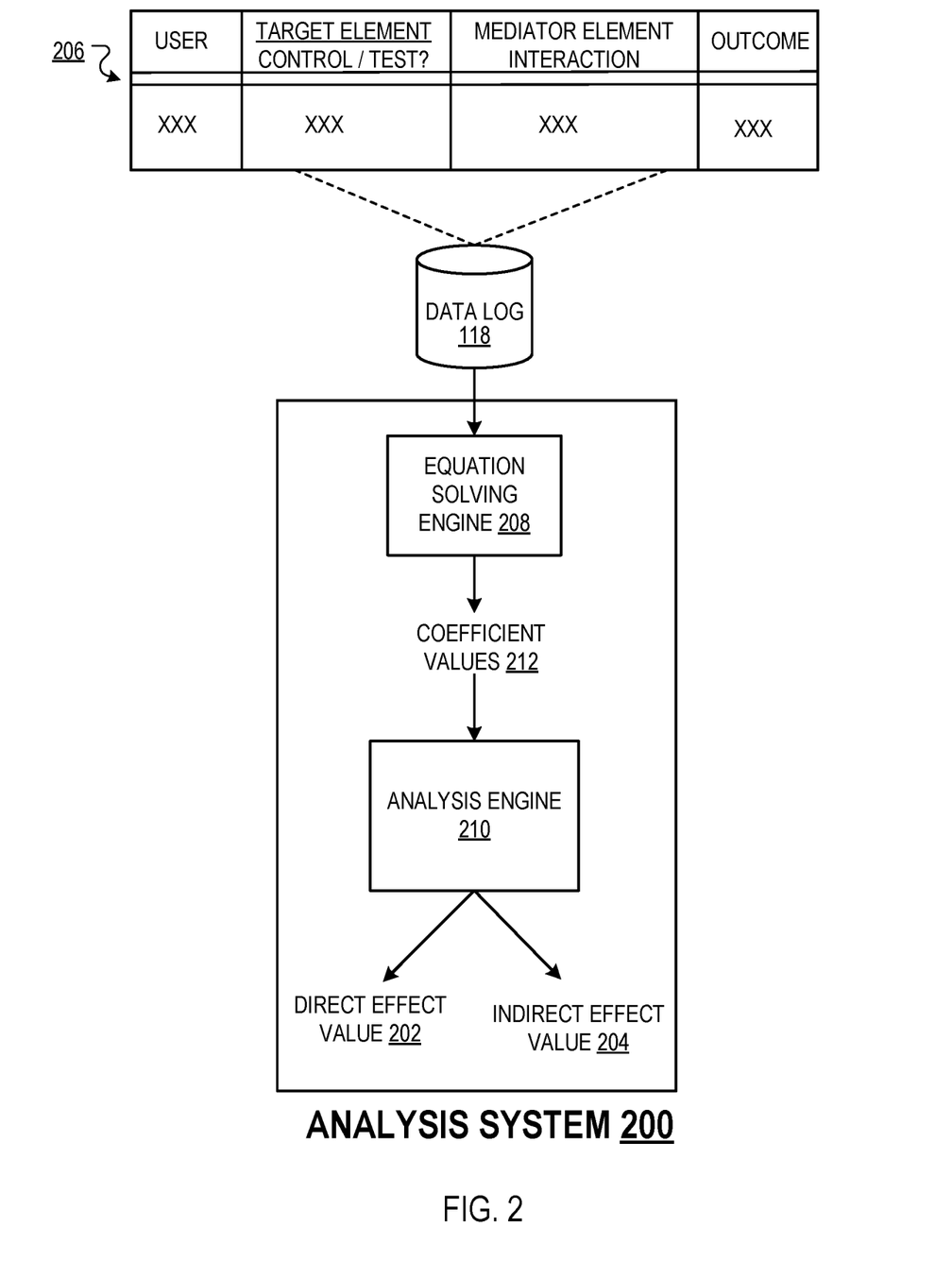
FIG. 2 shows an example analysis system.

FIG. 2 shows an example analysis system 200. The analysis system 200 is an example of a system implemented as computer programs on one or more computers in one or more locations in which the systems, components, and techniques described below are implemented.

The analysis system 200 is configured to process the logged data 118 characterizing user interaction with the online platform to generate, for each measured mediator element, a direct effect value 202 and an indirect effect value 204 corresponding to the mediator element. The logged data 118 may be represented, e.g., as a table 206 where each row corresponds to a respective user. A row of the table corresponding to a given user may specify: (i) whether the test version or the control version of the target element was presented to the user, (ii) measurements of the interaction of the user with one or more mediator elements, and (iii) a measurement of the outcome of the interaction of the user with the online platform.

The analysis system 200 determines the direct effect value 202 and the indirect effect value 204 corresponding to a mediator element using an equation solving engine 208 and an analysis engine 210, which will each be described in more detail next.

The equation solving engine 208 is configured to identify the values of coefficients 212 of a system of equations that characterizes: (i) user interaction with the mediator element, and (ii) the outcome of user interaction with the online platform. For example, the system of equations may be given by:

$$\begin{cases} M = \theta_{M,0} + \theta_{M,1} \cdot T + \mu_M \\ Y = \theta_{Y,0} + \theta_{Y,1} \cdot T + \theta_{Y,2} \cdot M + \theta_{Y,3} \cdot M \cdot T + \mu_Y \end{cases} \quad (1)$$

where M specifies the measurement of user interaction with the mediator element, T is a variable indicating whether the user was presented with the control version or the test version of the target element (e.g., T=0 may correspond to the user being presented with the control version, and T=1 may correspond to the user being presented with the test version), Y specifies the measurement of the outcome of the user interacting with the online platform, and $\theta_{M,0}$, $\theta_{M,1}$, $\mu_M$, $\theta_{Y,0}$, $\delta_{Y,1}$, $\theta_{Y,2}$, $\theta_{Y,3}$, and $\mu_Y$ are coefficients of the system of equations.

Generally, the equation solving engine 208 solves the system of equations (e.g., specified by equation (1)) by fitting values of the coefficients to the logged data 118 using any appropriate numerical technique. In one example, the equation solving engine 208 may separately fit the values of the coefficients of each equation specified by the system of equations to the logged data, e.g., using an ordinary least squares technique. In another example, the equation solving engine 208 may jointly fit the values of the coefficients of each equation specified by the system of equations to the logged data, e.g., using an iterative general method of moments (ITGMM) technique.

The analysis engine 210 is configured to process the coefficient values 212 from the system of equations to determine the direct effect value 202 and the indirect effect value 204 corresponding to the mediator element. Generally, the analysis engine 210 determines both the direct effect value 202 and the indirect effect value 204 as a function of the coefficient values 212. For example, the analysis engine 210 may determine the direct effect value DE as:

$$DE = \theta_{Y,1} + \theta_{Y,3}(\theta_{M,0} + \theta_{M,1} \cdot t) \quad (2)$$

where $\theta_{Y,1}$, $\theta_{Y,3}$, $\theta_{M,0}$, and $\theta_{M,1}$ are the coefficient values from the system of equations specified by equation (1), and t∈{0,1} (the choice of the value of t will be described in more detail below). In another example, the analysis engine 210 may determine the indirect effect value IE as:

$$IE = \theta_{M,1}(\theta_{Y,2} + \theta_{Y,3} \cdot t) \quad (3)$$

where $\theta_{M,1}$, $\theta_{Y,2}$, and $\theta_{Y,3}$ are the coefficient values from the system of equations specified by equation (1), and t∈{0,1}. The choice of the value of t affects the estimate of the direct effect value (e.g., specified by equation (2)) and the indirect effect value (e.g., specified by equation (3)). In particular, selecting t=0 may result in the direct effect value and the indirect effect value being estimated with reference to the users in the control group (i.e., that were presented the control version of the target element), and selecting t=1 may result in the direct effect value and the indirect effect value being estimated with reference to the users in the test group (i.e., that were presented with the test version of the target element).

The analysis system 200 may determine a respective direct effect value 202 and indirect effect value 204 for each measured mediator element. That is, for each measured mediator element, the analysis system 200 may fit the values of the coefficients of a system of equations (e.g., specified by equation (1)) to the logged data 118. The analysis system 200 may then determine the direct effect value and the indirect effect value corresponding to the mediator element based on the values of the coefficients (e.g., using equations (2)-(3)).

Optionally, the analysis system 200 may use a statistical significance test to estimate the statistical significance of the direct effect value and the indirect effect value corresponding to each mediator element. In one example, to determine the statistical significance of a direct effect value, the analysis system 200 may determine a p-value corresponding to the direct effect value under a null hypothesis specifying that the direct effect value is 0. The p-value may be provided by the probability under a standard Normal probability distribution (i.e., N(0,1)) of a test statistic given by:

$$DE/Avar(DE) \quad (4)$$

where DE is the estimated direct effect value and Avar(DE) is the asymptotic variance of DE (e.g., which can be computed using intermediate outputs generated by the equation solving engine 208 by solving the system of equations using the ITGMM technique). In another example, to determine the statistical significance of an indirect effect value, the analysis system 200 may determine a p-value corresponding to the indirect effect value under a null hypothesis specifying that the indirect effect value is 0. The p-value may be provided by the probability under a standard Normal probability distribution (i.e., N(0,1)) of a test statistic given by:

$$IE/Avar(IE) \tag{5}$$

where IE is the estimated indirect effect value and Avar(IE) is the asymptotic variance of IE (e.g., which can be computed using intermediate outputs generated by the equation solving engine 208 by solving the system of equations using the ITGMM technique).

Figure 3:
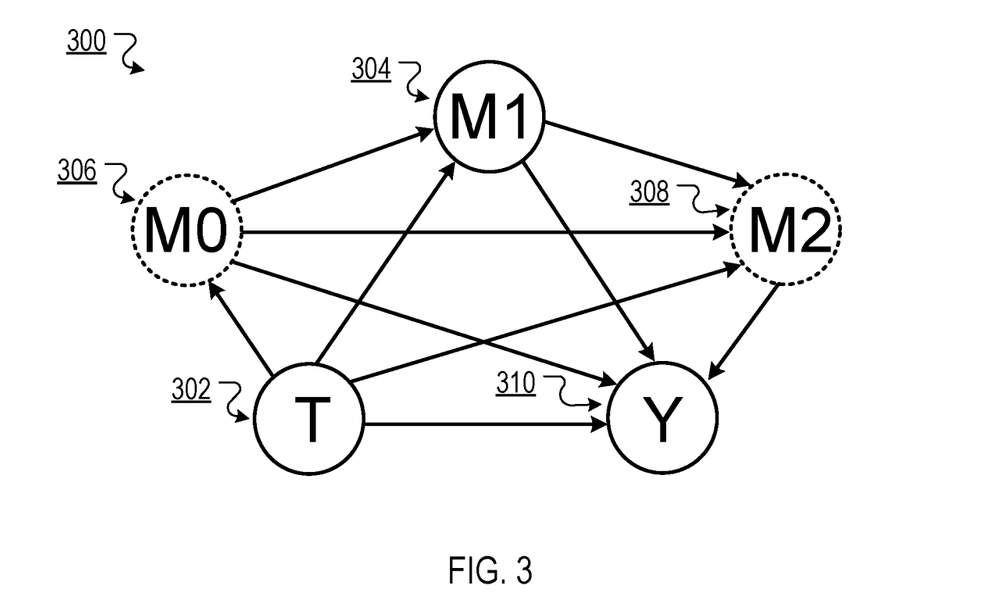
FIG. 3 shows a directed acyclic graph (DAG) that illustrates causal relationships between: (i) whether the control version or the test version of the target element is presented, (ii) a measured mediator element, (iii) unmeasured mediator elements, and (iv) an outcome of user interaction with the online platform.

FIG. 3 shows a directed acyclic graph (DAG) 300 that illustrates causal relationships between a set of variables given by: (i) T 302, indicating whether the control version or the test version of the target element is presented, (ii) M1 304, indicating the value of a measured mediator element, (iii) M0 306 and M2 308, indicating the values of unmeasured mediator elements, and (iv) Y 310, indicating the outcome of user interaction with the online platform. In the DAG, an arrow connects a first variable to a second variable if the two variables are causally-dependent, e.g., a change in the value of the first variable may cause a change in the value of the second variable. The mediators M0 306 and M2 308 may be referred to as "unmeasured causally-dependent" mediators, since they are not measured (e.g., by the testing system described with reference to FIG. 1) and are causally-related to one or more of: T 302, M1 304, and Y 310. The operations performed by the analysis system (described with reference to FIG. 2) can take into account the potential presence of unmeasured causally-dependent mediators in accurately estimating the direct effect value and the indirect effect value corresponding to measured mediators. In some cases, under certain assumptions (e.g., linear relationships among all variables), the operations performed by the analysis system may enable accurate estimation of the direct effect value and the indirect effect value even in the presence of unmeasured causally-dependent mediators.

Figure 4:
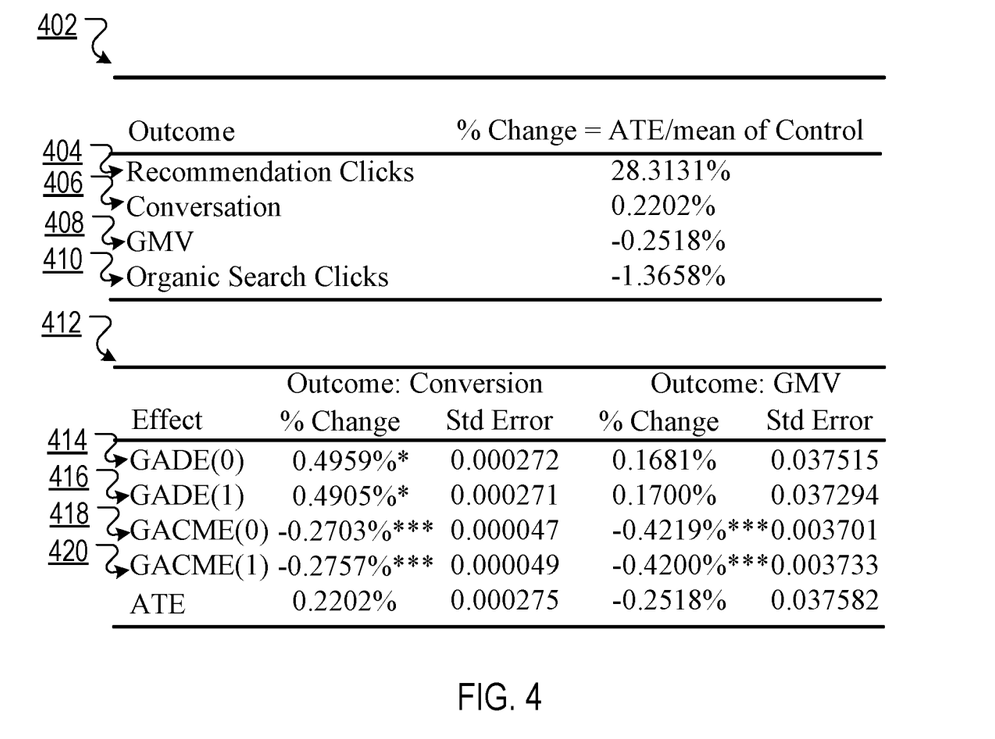
FIG. 4 illustrates an example of the results of using the testing system to perform an A/B test of a new recommendation module on an e-commerce website.

FIG. 4 illustrates an example of the results of using the testing system described with reference to FIG. 1 to test a new recommendation module of an e-commerce website. Table 402 shows an example of the results of conventional AB testing techniques, in particular, that using the new recommendation module results in a 28.3131% increase in clicks on the recommendation module 404, a 0.2202% increase in site wide conversion rate 406, a −0.2518% decrease in site wide GMV 408, and a −1.3658 decrease in clicks on a search module 410 of the e-commerce web site.

Table 412 shows an example of the results of the analysis performed by the analysis system described with reference to FIG. 2. In this example, the target element is the recommendation module and the mediator element is the search module. The 0.2202% increase in the site wide conversion rate 406 is broke down into: (i) a 0.4959% (generalized average direct effect (GADE(0)) 414) or 0.4905% (GADE (1) 416) increase in the conversion rate as a direct effect of the new recommendation module (where the slightly different estimates result from setting t equal to 0 or 1 in equation (2)), and (ii) a −0.2703% (generalized average causal mediation effect (GACME(0)) 418) or −0.2757% (GACME(1) 420) decrease in the conversion rate as an indirect effect of the new recommendation module that is caused by induced changes in user interaction with the search module (where the slightly different estimates result from setting t equal to 0 or 1 in equation (3)). Table 412 also shows the estimates of the direct effect and the indirect effect of the new recommendation module on the site wide GMV. In this example, an administrator of the e-commerce website may determine that the new recommendation module should be deployed, and that the search module should be improved to work better with the new recommendation module. In Table 412, asterisks denote statistical significance, i.e., where "*" denotes p-value <0.001, "" denotes p-value <0.01, "*" denotes p-value <0.05, "." denotes p-value <0.1, and "Std Error" refers to the asymptotic standard error.

Figure 5:
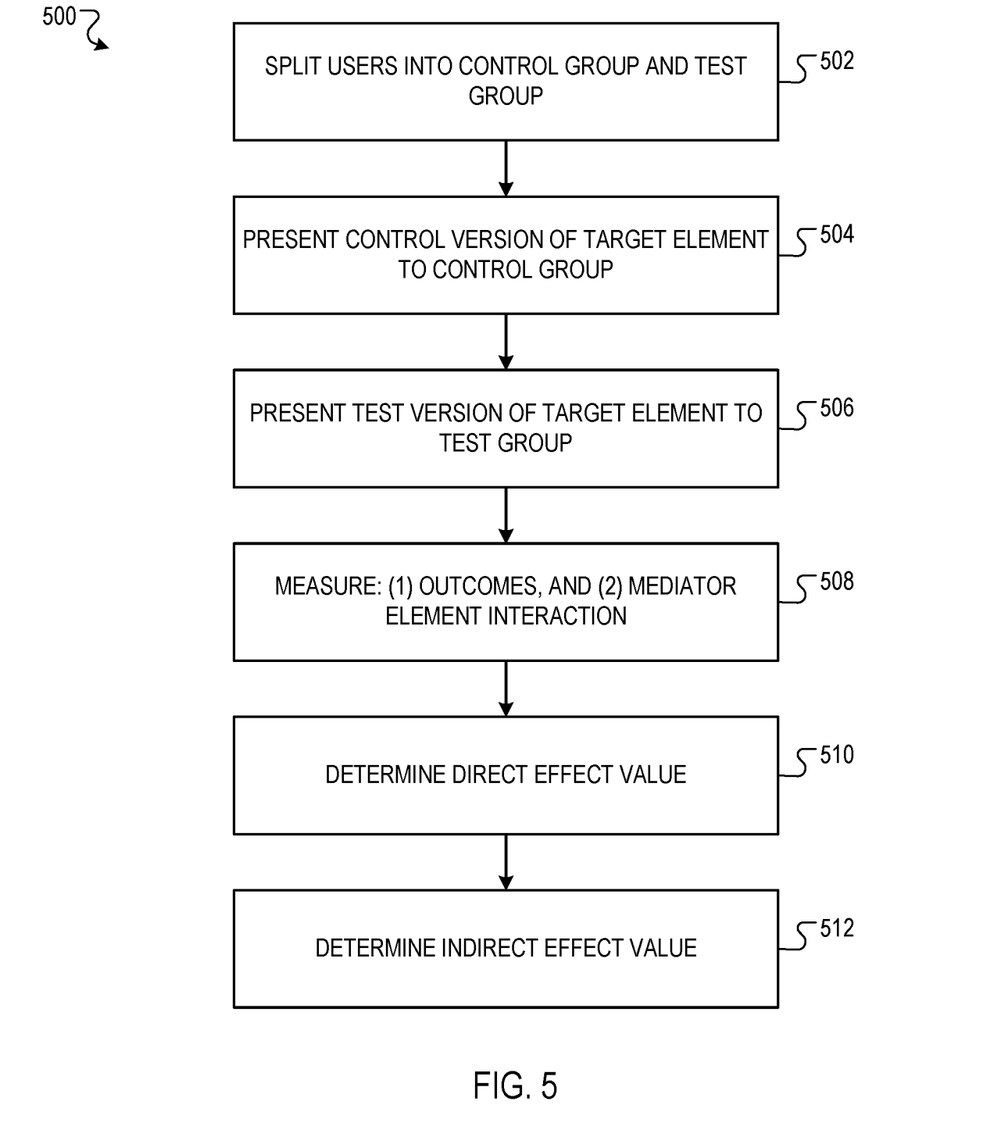
FIG. 5 is a flow diagram of an example process for performing an A/B test on a target element of an online platform.

FIG. 5 is a flow diagram of an example process 500 for performing an A/B test on a target element of an online platform. For convenience, the process 500 will be described as being performed by a system of one or more computers located in one or more locations. For example, an A/B testing system, e.g., the A/B testing system 120 of FIG. 1, appropriately programmed in accordance with this specification, can perform the process 500.

The system splits a population of users of the online platform into at least a control group of users and a test group of users (502). For example, the system may randomly assign users into the control group and the test group.

The system presents the control version of the target element to the control group of users (504).

The system presents the test version of the target element to the test group of users (506).

For each user in the population of users, the system measures: (i) an outcome of the user interacting with the online platform, and (ii) an interaction of the user with a mediator element of the online platform (508).

The system determines, based on the A/B test, a direct effect value that estimates an expected change in user outcomes when the test version of the target element is presented instead of the control version of the target element that is caused independently of induced changes in user interaction with the mediator element (510).

The system determines, based on the A/B test, an indirect effect value that estimates an expected change in user outcomes when the test version of the target element is presented instead of the control version of the target element that is caused by induced changes in user interaction with the mediator element (512).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
  conducting an A/B test on a target element of an online platform, comprising:
    selecting a measured mediator element of the online platform from a set of possible mediator elements of the online platform;
    identifying a plurality of other mediator elements from the set of possible mediator elements as unmeasured mediator elements;
    splitting a population of users of the online platform into at least a control group of users and a test group of users;
    presenting a control version of the target element to the control group of users and presenting a test version of the target element to the test group of users; and
    for each user in the population of users, measuring: (i) an outcome of the user interacting with the online platform, and (ii) an interaction of the user with the measured mediator element of the online platform, while refraining from measuring interaction of the user with the unmeasured mediator elements;
  determining a direct effect and an indirect effect of the test version of the target element on user outcomes as mediated by the measured mediator element, comprising:
    determining, based on the A/B test, a direct effect value that estimates an expected change in user outcomes when the test version of the target element is presented instead of the control version of the target element that is caused independently of induced changes in user interaction with the measured mediator element; and
    determining, based on the A/B test, an indirect effect value that estimates an expected change in user outcomes when the test version of the target element is presented instead of the control version of the target element that is caused by induced changes in user interaction with the measured mediator element;
    wherein the direct effect value and the indirect effect value do not depend on data measuring user interaction with the unmeasured mediator elements.

2. The method of claim 1, wherein determining the direct effect value and the indirect effect value comprises:
  identifying values of coefficients of a system of equations based on the A/B test, wherein the system of equations comprises:
    a first equation that expresses user interaction with the measured mediator element as a function of whether the control version or the test version of the target element was presented, and
    a second equation that expresses the outcome of user interaction with the online platform as a function of: (i) whether the control version or the test version of the target element was presented, and (ii) user interaction with the measured mediator element; and
  determining the direct effect value and the indirect effect value based on the values of the coefficients of the system of equations.

3. The method of claim 2, wherein the first equation and the second equation are linear equations.

4. The method of claim 3, wherein:
  the first equation is given by:

$$M = \theta_{M,0} + \theta_{M,1} \cdot T + \mu_M$$

wherein M specifies user interaction with the measured mediator element, T specifies whether the control version or the test version of the target element was presented, and $\theta_{M,0}$, $\theta_{M,1}$, and $\mu_M$ are coefficients of the system of equations; and
  the second equation is given by:

$$Y = \theta_{Y,0} + \theta_{Y,1} \cdot T + \theta_{Y,2} \cdot M + \theta_{Y,3} \cdot M \cdot T + \mu_Y$$

wherein Y specifies the outcome of user interaction with the online platform, T specifies whether the control version or the test version of the target element was presented, M specifies user interaction with the measured mediator element, and $\theta_{Y,0}$, $\theta_{Y,1}$, $\theta_{Y,2}$, $\theta_{Y,3}$, and $\mu_Y$ are coefficients of the system of equations.

5. The method of claim 2, wherein identifying the values of the coefficients of the system of equations comprises using an ordinary least squares technique.

6. The method of claim 2, wherein identifying the values of the coefficients of the system of equations comprises using an iterative general method of moments (ITGMM) technique.

7. The method of claim 4, wherein determining the direct effect value and the indirect effect value based on the values of the coefficients of the system of equations comprises:
   determining the direct effect value DE as:

$$DE = \theta_{Y,1} + \theta_{Y,3}(\theta_{M,0} + \theta_{M,1} \cdot t),$$

wherein t=0 or t=1, and
   determining the indirect effect value IE as:

$$IE = \theta_{M,1}(\theta_{Y,2} + \theta_{Y,2} \cdot t),$$

wherein t=0 or t=1.

8. The method of claim 1, further comprising determining a statistical significance of the direct effect value and determining a statistical significance of the indirect effect value.

9. The method of claim 1, wherein the online platform comprises an e-commerce web site.

10. The method of claim 1, wherein splitting the population of users of the online platform into at least the control group of users and the test group of users comprises randomly splitting the population of users of the online platform into at least the control group of users and the test group of users.

11. The method of claim 1, wherein the target element of the online platform comprises a recommendation module.

12. The method of claim 1, wherein the measured mediator element of the online platform comprises a search module.

13. The method of claim 1, wherein the measured mediator element of the online platform comprises a promoted listings module.

14. The method of claim 1, wherein the outcome of the user interacting with the online platform comprises a conversion status of the user or a value of products purchased by the user on the online platform.

15. A system comprising:
   one or more computers; and
   one or more storage devices communicatively coupled to the one or more computers, wherein the one or more storage devices store instructions that, when executed by the one or more computers, cause the one or more computers to perform operations comprising:
   conducting an A/B test on a target element of an online platform, comprising:
      selecting a measured mediator element of the online platform from a set of possible mediator elements of the online platform;
      identifying a plurality of other mediator elements from the set of possible mediator elements as unmeasured mediator elements;
      splitting a population of users of the online platform into at least a control group of users and a test group of users;
      presenting a control version of the target element to the control group of users and presenting a test version of the target element to the test group of users; and
      for each user in the population of users, measuring: (i) an outcome of the user interacting with the online platform, and (ii) an interaction of the user with the measured mediator element of the online platform, while refraining from measuring interaction of the user with the unmeasured mediator elements;
   determining a direct effect and an indirect effect of the test version of the target element on user outcomes as mediated by the measured mediator element, comprising:
      determining, based on the A/B test, a direct effect value that estimates an expected change in user outcomes when the test version of the target element is presented instead of the control version of the target element that is caused independently of induced changes in user interaction with the measured mediator element; and
      determining, based on the A/B test, an indirect effect value that estimates an expected change in user outcomes when the test version of the target element is presented instead of the control version of the target element that is caused by induced changes in user interaction with the measured mediator element;
   wherein the direct effect value and the indirect effect value do not depend on data measuring user interaction with the unmeasured mediator elements.

16. The system of claim 15, wherein determining the direct effect value and the indirect effect value comprises:
   identifying values of coefficients of a system of equations based on the A/B test, wherein the system of equations comprises:
      a first equation that expresses user interaction with the measured mediator element as a function of whether the control version or the test version of the target element was presented, and
      a second equation that expresses the outcome of user interaction with the online platform as a function of: (i) whether the control version or the test version of the target element was presented, and (ii) user interaction with the measured mediator element; and
   determining the direct effect value and the indirect effect value based on the values of the coefficients of the system of equations.

17. The system of claim 16, wherein the first equation and the second equation are linear equations.

18. One or more non-transitory computer storage media storing instructions that when executed by one or more computers cause the one or more computers to perform operations comprising:
   conducting an A/B test on a target element of an online platform, comprising:
      selecting a measured mediator element of the online platform from a set of possible mediator elements of the online platform;
      identifying a plurality of other mediator elements from the set of possible mediator elements as unmeasured mediator elements;
      splitting a population of users of the online platform into at least a control group of users and a test group of users;
      presenting a control version of the target element to the control group of users and presenting a test version of the target element to the test group of users; and
      for each user in the population of users, measuring: (i) an outcome of the user interacting with the online platform, and (ii) an interaction of the user with the measured mediator element of the online platform, while refraining from measuring interaction of the user with the unmeasured mediator elements;

determining a direct effect and an indirect effect of the test version of the target element on user outcomes as mediated by the measured mediator element, comprising:

determining, based on the A/B test, a direct effect value that estimates an expected change in user outcomes when the test version of the target element is presented instead of the control version of the target element that is caused independently of induced changes in user interaction with the measured mediator element; and determining, based on the A/B test, an indirect effect value that estimates an expected change in user outcomes when the test version of the target element is presented instead of the control version of the target element that is caused by induced changes in user interaction with the measured mediator element;

wherein the direct effect value and the indirect effect value do not depend on data measuring user interaction with the unmeasured mediator elements.

19. The non-transitory computer storage media of claim 18, wherein determining the direct effect value and the indirect effect value comprises:

identifying values of coefficients of a system of equations based on the A/B test, wherein the system of equations comprises:

a first equation that expresses user interaction with the measured mediator element as a function of whether the control version or the test version of the target element was presented, and a second equation that expresses the outcome of user interaction with the online platform as a function of: (i) whether the control version or the test version of the target element was presented, and (ii) user interaction with the measured mediator element; and determining the direct effect value and the indirect effect value based on the values of the coefficients of the system of equations.

20. The non-transitory computer storage media of claim 19, wherein the first equation and the second equation are linear equations.

* * * * *

UNITED STATES PATENT AND TRADEMARK OFFICE
CERTIFICATE OF CORRECTION

PATENT NO. : 11,132,700 B1  
APPLICATION NO. : 16/678739  
DATED : September 28, 2021  
INVENTOR(S) : Yin et al.

Page 1 of 1

It is certified that error appears in the above-identified patent and that said Letters Patent is hereby corrected as shown below:

In the Claims

Column 15, Line 19, in Claim 7, delete "IE=$\theta_{M,1}(\theta_{Y,2}+\theta_{Y,2}\cdot t)$," and insert -- IE=$\theta_{M,1}(\theta_{Y,2}+\theta_{Y,3}\cdot t)$, --, therefor.

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*